(12) United States Patent
Gao et al.

(10) Patent No.: US 11,656,351 B2
(45) Date of Patent: May 23, 2023

(54) METHOD AND MOBILE DEVICE FOR ACQUIRING AR OR VR INFORMATION BY AVERAGING PIXEL VALUES

(71) Applicant: BEIJING XIAOMI MOBILE SOFTWARE CO., LTD., Beijing (CN)

(72) Inventors: Wenjun Gao, Beijing (CN); Cong Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 430 days.

(21) Appl. No.: 16/871,908

(22) Filed: May 11, 2020

(65) Prior Publication Data
US 2021/0223386 A1    Jul. 22, 2021

(30) Foreign Application Priority Data
Jan. 17, 2020    (CN) .................. 202010054123.9

(51) Int. Cl.
*G01S 13/89*    (2006.01)
*G01S 13/42*    (2006.01)
*G06T 5/50*    (2006.01)
*H04W 88/02*    (2009.01)

(52) U.S. Cl.
CPC .............. *G01S 13/89* (2013.01); *G01S 13/42* (2013.01); *G06T 5/50* (2013.01); *H04W 88/02* (2013.01)

(58) Field of Classification Search
CPC .......... G01S 13/89; G01S 13/42; G01S 13/08; G01S 13/867; G06T 5/50; H04W 88/02; G06F 3/011; G06N 3/08
See application file for complete search history.

(56) References Cited

U.S. PATENT DOCUMENTS

| 9,196,067 | B1 * | 11/2015 | Freed ...................... G01S 17/66 |
| 2001/0035837 | A1 * | 11/2001 | Fullerton ................ G01S 7/003 342/21 |
| 2014/0368378 | A1 * | 12/2014 | Crain .................. G01S 13/9089 342/25 A |

(Continued)

FOREIGN PATENT DOCUMENTS

CN       107392996       11/2017

OTHER PUBLICATIONS

Extended European Search Report dated Oct. 30, 2020 in the European application No. 20176137.6, 10 pages.

(Continued)

*Primary Examiner* — Donald H B Braswell
(74) *Attorney, Agent, or Firm* — Oblon, McClelland, Maier & Neustadt, L.L.P.

(57) ABSTRACT

The disclosure relates to a method and device for acquiring augmented reality (AR) information or virtual reality (VR) information, a mobile terminal, and a storage medium. The method can include an image collection step where a radar wave is transmitted and an echo formed based on the radar wave is received. Based on a transmitting parameter of the radar wave and an echo parameter of the echo, spatial structure information of a collected object in the image collection can be determined. Further, AR information or VR information of the collected object is obtained according to the spatial structure information and a collected image.

15 Claims, 12 Drawing Sheets

(56) References Cited

U.S. PATENT DOCUMENTS

2018/0089847 A1* 3/2018 Lee .................... G01S 7/4865
2022/0253060 A1* 8/2022 Xu ..................... B62D 57/032

OTHER PUBLICATIONS

Nguyen Lam et al: "Augmented reality using ultra-wideband radar imagery", Radar Sensor Technology XV, SPIE, 1000. 20th St. Bellingham WA 98225-6705 USA, vol. 8021, No. 1, May 13, 2011 (May 13, 2011), pp. 1-6, XP060014604, DOI:10.1117/12.883285. [retrieved on Jan. 1, 1901].
Zhuravlev A V et al: "On the use of augmented reality devices for subsurface radar imaging", 2016 Progress in Electromagnetic Research Symposium(PIERS), IEEE, Aug. 8, 2016(Aug. 8, 2016), pp. 2132-2136. XP032997044. DOI:10.1109/PIERS.2016.7734890. [retrieved on Nov. 3, 2016].

* cited by examiner

METHOD AND MOBILE DEVICE FOR ACQUIRING AR OR VR INFORMATION BY AVERAGING PIXEL VALUES

CROSS-REFERENCE TO RELATED APPLICATIONS

This application is based upon and claims priority to Chinese Patent Application No. 202010054123.9, filed on Jan. 17, 2020, the entire content of which is incorporated herein by reference.

TECHNICAL FIELD

The disclosure relates to the technical field of mobile terminals, and more particularly, to a method and device for acquiring augmented reality (AR) information or virtual reality (VR) information, a mobile terminal, and a storage medium.

BACKGROUND

An AR technology superimposes a real environment and a virtual object on the same picture or space in real lime. A VR technology provides a sense of environmental immersion by simulating a virtual environment. The AR technology and die VR technology are increasingly being applied to different scenarios of daily life. For example, based on the VR technology, people can judge in advance whether a purchased object is suitable for a current space, and can directly see an effect of trying on a certain piece of clothing. The AR technology and the VR technology are increasingly applied to improve the user experience.

However, in AR and VR scenarios, there are often various errors between AR information or VR information which is obtained by using objects in a real environment based on image processing algorithms, such as deep learning and the like and information of the objects in the real environment, and the user experience is affected SUMMARY According to a first aspect of the disclosure, a method for acquiring AR information or VR information is provided. The method is applied to a mobile terminal and can include transmuting, during image collection, a radar wave and receiving an echo formed based on the radar wave, determining, according to a transmuting parameter of the radar wave and an echo parameter of the echo, spatial structure information of a collected object in the image collection, and obtaining AR information or VR information of the collected object according to the spatial structure information and a collected image.

According to a second aspect of the disclosure, a dev ice for acquiring AR information or VR information is provided. The device is applied to a mobile terminal. The device includes a transceiver module and a processing module. The transceiver module is configured to transmit, during image collection, a radar wave and receive an echo formed based on the radar wave. The processing module is configured to determine, according to a transmitting parameter of the radar wave and an echo parameter of the echo, spatial structure information of a collected object in the image collection. The processing module can further obtain AR information or VR information of the collected object according to the spatial structure information and a collected image.

According to a third aspect of the disclosure, a mobile terminal is provided. The mobile terminal can include a processor and a memory that is configured to store instructions executable by the processor. The processor is configured to implement, when executing the executable instructions, the above method steps.

According to a fourth aspect of the disclosure, a non-transitory computer-readable storage medium having a computer program stored thereon is provided. The program is executed by a processor to implement the above method steps.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
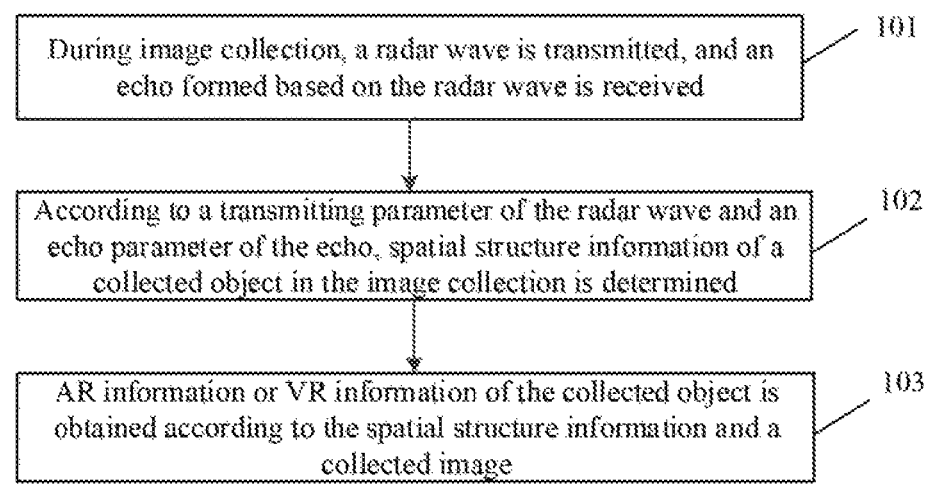
FIG. 1 is a flow chart showing a method for acquiring AR information or VR information, according to an exemplary embodiment.

FIG. 1 is a flow chart showing a method for acquiring AR information or VR information, according to an exemplary embodiment. As illustrated in FIG. 1, the method is applied to a mobile terminal. The method includes the following steps.

In step 101, during image collection, a radar wave is transmitted, and an echo formed based on the radar wave is received. Here, the mobile terminal may be a terminal such as a mobile phone, a tablet, a laptop, and the like. The mobile terminal may also be a wearable device, such as a smart watch, a smart bracelet, and the like. In short, any mobile terminal which includes an image collection module and is capable of image collection can be used. Here, an application of AR and/or VR can be run on/in the mobile terminal. The application may be to collect image data through the image collection module.

Figure 2:
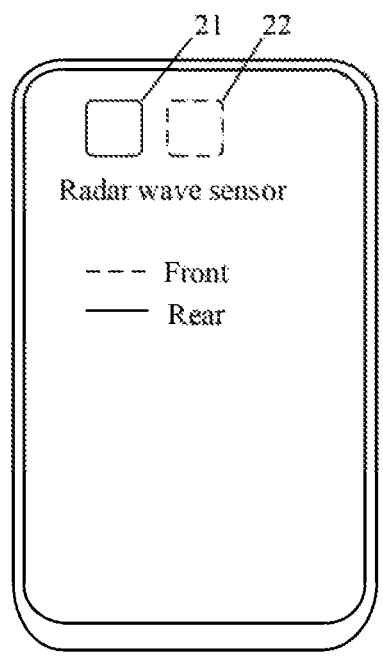
FIG. 2 is a schematic diagram illustrating a mobile terminal with a radar sensor, according to an exemplary embodiment.

The radar wave may be emitted by a radar sensor installed on the mobile terminal. FIG. 2 shows a schematic diagram illustrating a mobile terminal with/including a radar sensor, according to an exemplary embodiment. As illustrated in FIG. 2, at least one radar sensor may be installed on the mobile terminal. For example, two radar sensors are installed on the mobile terminal. The two radar sensors may include a front radar sensor 21 installed on the same side as a front camera in the mobile terminal 2, and a rear radar sensor 22 installed on the same side as a rear camera in the mobile terminal 2. Of course, in other embodiments, the radar sensor may also be installed at other positions of the mobile terminal, which is not limited in any way.

In an embodiment, the front camera and the front radar sensor constitute a functional module group for implementing image processing. The rear camera and the rear radar sensor constitute another functional module group for implementing image processing. In an embodiment, radar sensors installed on different sides of the mobile terminal may transmit radar waves at any angle in front of the different sides of the mobile terminal. For example, the front radar sensor 21 installed on the same side as the front camera in the mobile terminal may be configured to transmit a radar wave to an object in image information which can be collected by the front camera. The rear radar sensor 22 installed on the same side as the rear camera in the mobile terminal may be configured to transmit a radar wave to an object in image information which can be collected by the rear camera.

In an embodiment, the radar sensor may be disposed on a rotating component of the mobile terminal, and the rotating component in the mobile terminal can drive the radar sensor to change its direction. For example, the radar sensor is driven by the rotating component to face a display screen side, or the radar sensor is driven by the rotating component to transmit a radar wave in a set direction.

In practical applications, there may be one or more radar sensors. The radar sensor may be disposed on any side of the mobile terminal. Further, the echo is a radar wave signal which is formed by the radar wave being reflected by a surface of an object back to the mobile terminal after encountering die object during a transmission process.

In step 102, according to a transmitting parameter of the radar wave and an echo parameter of the echo, spatial structure information of a collected object in the image collection is determined.

Figure 3:
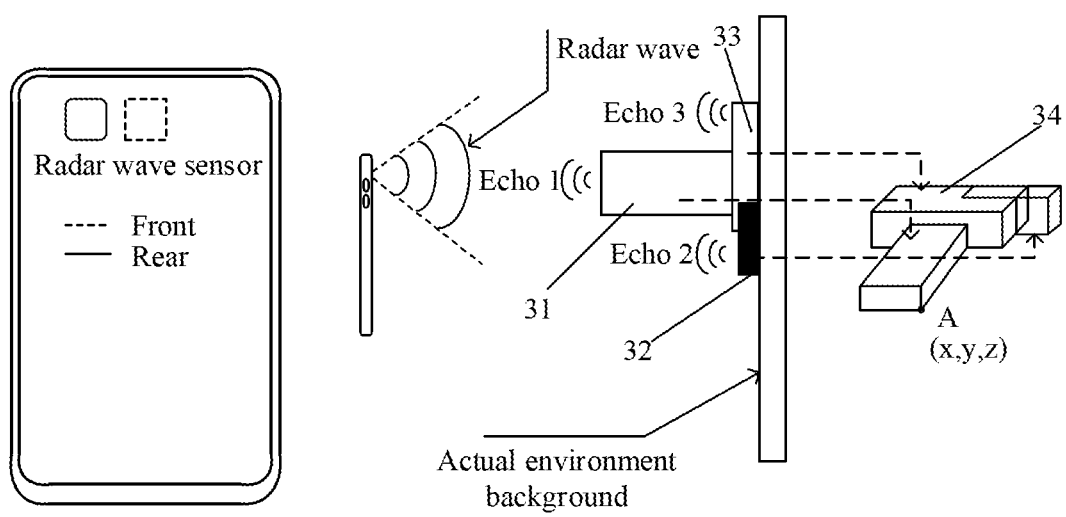
FIG. 3 is a schematic diagram illustrating an application scenario in which a mobile terminal with a radar sensor transmits a radar wave and receives an echo, according to an exemplary embodiment.

FIG. 3 shows a schematic diagram illustrating an application scenario in which a mobile terminal with a radar sensor transmits a radar wave and receives an echo, according to an exemplary embodiment. In the application scenario, a mobile terminal with a radar sensor and a collected object are included. The collected object includes a first object 31, a second object 32, and a third object 33. After transmitting a radar wave through the radar wave sensor, the mobile terminal will receive a radar wave reflected at one or more positions on an outer surface of the first object 31 to obtain an echo 1, receive a radar wave reflected at one or more positions on an outer surface of the second object 32 to obtain an echo 2, and receive a radar wave reflected at one or more positions on an outer surface of the third object 33 to obtain an echo 3.

In an embodiment, the transmitting parameter may be a time parameter for transmuting the radar wave. For example, the transmitting parameter is 10:10:10. The echo parameter may be a time parameter for receiving live echo. For example, the echo parameter is 10:10:11. The transmitting parameter may further include an angle parameter for transmitting the radar wave. The echo parameter may also be an angle parameter for receiving the echo.

In an embodiment, the spatial structure information may be coordinate information including different positions of the collected object. The coordinate information may be coordinate information in a space coordinate system with a reference point on the mobile terminal as an origin, such as coordinate information in a three-dimensional space coordinate system with a set point of the radar sensor as a reference origin. For example, coordinate information of a corner point A of the first object is A (x, y, z). Here, x, y, and z respectively correspond to coordinates of three dimensions in a coordinate system. Here, the spatial structure information of the collected object may be a set of coordinate information of different positions of the collected object. In an embodiment, the coordinate information of different positions in the set may be assembled into a virtual space model 34. The virtual space model 34 may be configured to display a virtual space model in AR or VR.

The spatial structure information may include a contour shape of the collected object, for example, an outer contour shape. For example, if the collected object is a human body, the outer contour shape indicated by the spatial structure information is consistent with a shape of the human body. If the collected object is a square book, an outer contour shape indicated by the spatial structure information is square In some embodiments, the spatial structure information may include a size of an outer contour of the collected object, and the like. In short, the shape of the collected object can be roughly described based on the spatial structure information.

In step 103, AR information or VR information of the collected object is obtained according to the spatial structure information and a collected image. The image may be a gray image. The image includes feature information about colors, textures, and the like related to the collected object. Here, the AR information or VR information of the collected object includes space model information of the collected object.

In an embodiment, the AR information may be, after superimposing a real environment and the virtual space model determined according to the spatial structure information and the collected image to the same picture or space, information included in the virtual space model. In another embodiment, the VR information may be information of in the virtual space model determined according to the spatial structure information and the collected image. It should be noted that the AR information may further include information of other objects other than/besides the collected object. For example, in a face makeup application scenario of AH, the AR information may further include information about cosmetic components on different parts of the face.

Figure 4:
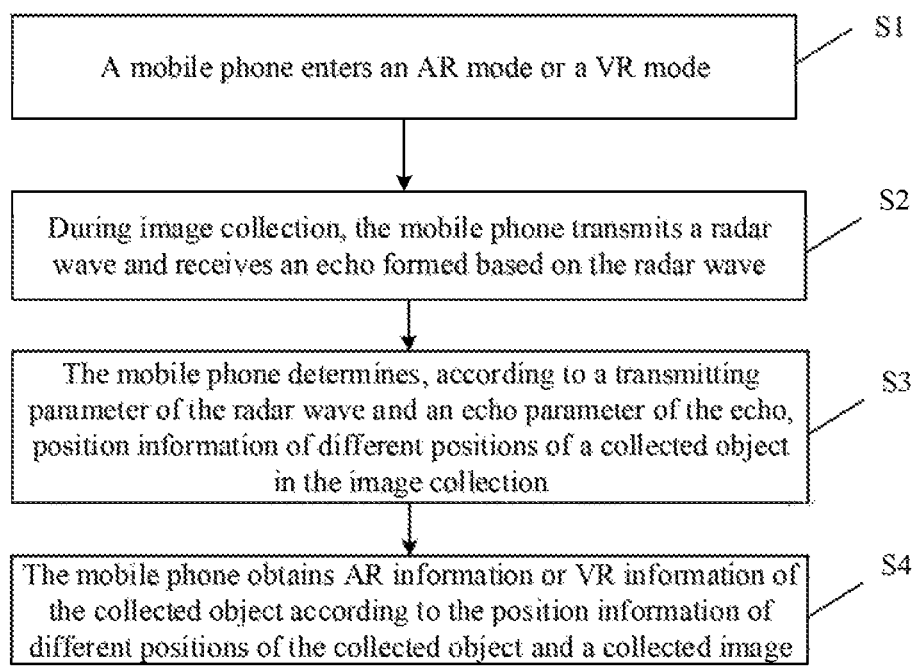
FIG. 4 is a flow chart showing a method for acquiring AR information or VR information, according to another exemplary embodiment.

In an embodiment, a mobile phone is taken as an example FIG. 4 shows a flow chart showing a method for acquiring AR information or VR information, according to another exemplary embodiment. The method includes the following steps.

In step S1, a mobile phone enters an AR mode or a VR mode.

In step S2, during image collection, the mobile phone transmits a radar wave and receives an echo formed based on the radar wave.

In step S3, the mobile phone determines, according to a transmitting parameter of the radar wave and an echo parameter of the echo, position information of different positions of a collected object in the image collection.

In step S4, the mobile phone obtains AR information or VR information of the collected object according to the position information of different positions of the collected object and a collected image.

In this embodiment, during image collection, a radar wave is transmitted, and an echo formed based on the radar wave is received. According to a transmitting parameter of the radar wave and an echo parameter of the echo, spatial structure information of a collected object in the image collection is determined. Here, compared with a technique in which a deep learning model is used to obtain spatial structure information, it is more accurate to acquire the spatial structure information of the collected object by directly detecting the radar wave to acquire. The AR information or VR information of the collected object is obtained according to the spatial structure information and a collected image. Here, since the spatial structure information of the collected object is directly acquired based on the detection of the radar wave, an error between the spatial structure information and real information of the collected object will be smaller. The AR information or the VR information of the collected object obtained according to the spatial structure information and the collected image can more accurately describe the collected object, thereby improving the authenticity of the collected object in an AR or VR scenario, and improving the user experience.

Figure 5:
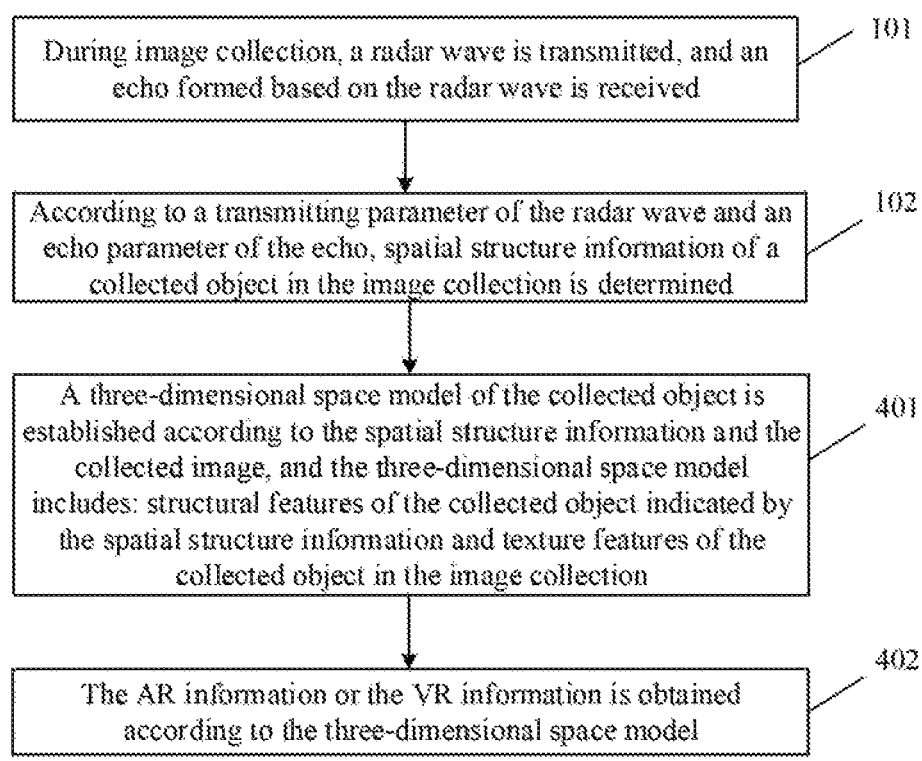
FIG. 5 is a flow chart showing a method for acquiring AR information or VR information, according to another exemplary embodiment.

FIG. 5 is a flow chart showing a method for acquiring AR information or VR information, according to another exemplary embodiment. As illustrated in FIG. 5, step 103 in which the AR information or VR information of the collected object is obtained according to the spatial structure information and the collected image includes the following steps.

In step 401, a three-dimensional space model of the collected object is established according to the spatial structure information and the collected image. The three-dimensional space model includes structural features of the collected object indicated by the spatial structure information and texture features of the collected object in the image collection.

In an embodiment, the three-dimensional space model may be a mathematical model which is generated based on the spatial structure information and the collected image and is capable of reflecting features of the collected object such as a space structure, texture, and the like. The mathematical model may be visually displayed on application software of AR or VR.

In an embodiment, feature information of each pixel point in the image may be represented by a feature vector (r, g, b). Here, r, g, and b represent brightness values corresponding to three channels of red, green, and blue, respectively. The image may include feature information of the plurality of pixel points In an embodiment, the position information of different positions of the collected object relative to the mobile terminal is represented by (x, y, z). Here, x, y, and z are coordinate values of each dimension in a three-dimensional rectangular space coordinate system respectively. Each pixel point in the image may correspond to a position of the collected object. The spatial structure information may be coordinate information of the plurality of positions.

In an embodiment, the operation that a three-dimensional space model of the collected object is established may include that, position information of different positions of the collected object and feature information of the pixel point are merged. For example, position information of a target position of the collected object is represented as coordinates (x, y, z), and feature information of a corresponding pixel point is represented as a feature vector (r, g, b). After the position information of the target position of the collected object and the feature information of the pixel point are merged, it may be represented as a feature vector B (x, y, z, r, g, b). The feature vector B may be configured to display the three-dimensional space model. In an embodiment, a set of feature vectors B may be configured to visualize an AR or VR space model of the collected object.

Here, the texture feature may be a visual feature reflecting the collected object, and may reflect an arrangement property of a surface structure organization having a slow change or a periodic change on the surface of the collected object.

In step 402, the AR information or the VR information is obtained according to the three-dimensional space model. In an embodiment, the coordinate information of different positions of the collected object and the texture information of the surface of the collected object may be obtained according to the three-dimensional space model.

Figure 6:
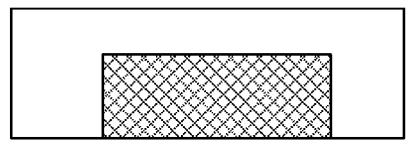
FIG. 6 is a schematic diagram illustrating a picture in AR or VR, according to an exemplary embodiment.
Figure 7:
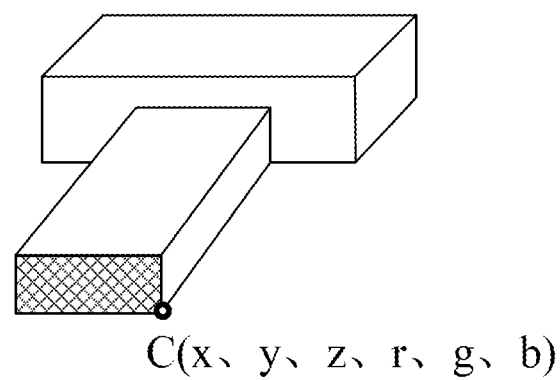
FIG. 7 is a schematic diagram illustrating a space model obtained by using a method of an embodiment of the disclosure, according to an exemplary embodiment.

FIG. 6 shows a schematic diagram illustrating a picture in AR or VR, according to an exemplary embodiment. The picture is relatively single and has only color and texture information. Referring to FIG. 7, FIG. 7 is a schematic diagram illustrating a space model obtained by using a method of an embodiment of the disclosure, according to an exemplary embodiment. It includes not only color and texture information but also space coordinate information. For example, position C on/of the collected object is taken as an example. The feature vector corresponding to point C is C (x, y, z, r, g, b), where x, y, and z are the space coordinate information.

Figure 8:
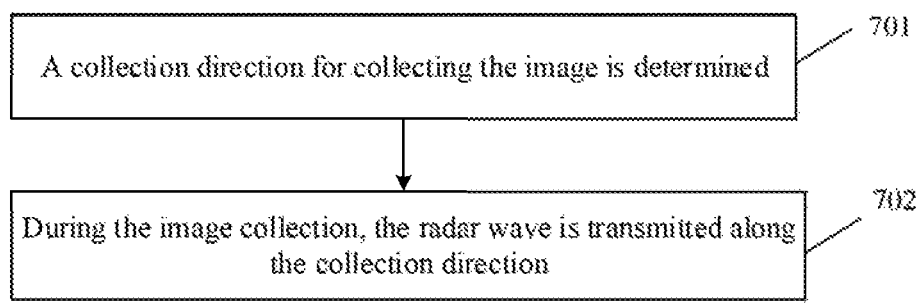
FIG. 8 is a flow chart showing a method for acquiring AR information or VR information, according to another exemplary embodiment.

FIG. 8 is a flow chart showing a method for acquiring AR information or VR information, according to another exemplary embodiment. As illustrated in FIG. K, the method further includes the following steps.

In step 701, a collection direction for collecting the image is determined In an embodiment, it may be determined that a direction in which a collected object is located relative to a mobile terminal is the collection direction.

In step 702, during the image collection, the radar wave is transmitted along the collection direction. The direction in which the collected object is located relative to the mobile terminal may be determined first, and a radar wave is transmitted along the direction in which the collected object is located relative to the mobile terminal during image collection. For example, the above described from radar sensor is taken as an example. If the collected object is directly in front of the mobile terminal, it is only necessary to control a radar wave to be scanned and transmuted within a certain range directly in front, if the collected object is in a direction that is 30 degrees to the right from a front direction of the mobile terminal, it is only necessary to control a radar wave to be scanned and transmitted within a certain range of the direction that is 30 degrees to the right from the front direction. In this way, a transmission range of the radar wave may be reduced, not only the speed of detecting the spatial structure information of the collected object can be improved, but also the power consumption of the mobile terminal can be saved.

In some embodiments, the operation that the direction in which the collected object is located relative to the mobile terminal is determined may include that: an area range corresponding to the collected image is initially scanned by the radar wave first to roughly determine a direction in which the collected object is located.

Figure 9:
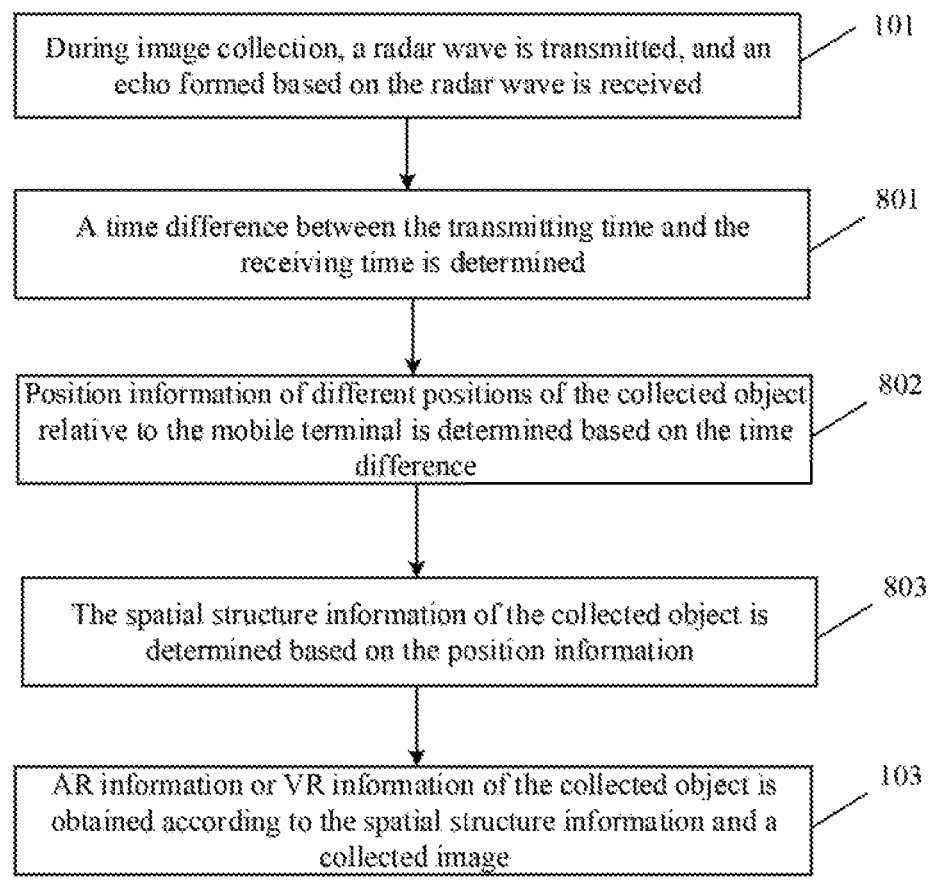
FIG. 9 is a flow chart showing a method for acquiring AR information or VR information, according to another exemplary embodiment.

FIG. 9 is a flow chart showing a method for acquiring AR information or VR information, according to another exemplary embodiment. A transmitting parameter includes transmitting time, and an echo parameter includes receiving time. As illustrated in FIG. 9, step 102 in which spatial structure information of the collected object in the image collection is determined according to the transmitting parameter of the radar wave and the echo parameter of the echo includes the following steps.

In step 801, a time difference between the transmitting tune and the receiving time is determined. In an embodiment, if the transmitting time is 10:10:10, the receiving time is 10:10:11, and the time difference is 1 s.

In step 802, position information of different positions of the collected object relative to the mobile terminal is determined based on the time difference. In an embodiment, a distance between different positions of the collected object relative to the mobile terminal may be determined based on a transmission speed of the radar wave and the lime difference, and then position information of different positions of the collected object relative to the mobile terminal may be determined based on the distance. In an embodiment, position information of different positions of the collected object relative to the mobile terminal may also be determined based on die distance and an angle of transmitting the radar wave. Here, the position information may be coordinate information of different positions of the collected object relative to the mobile terminal.

In step 803, the spatial structure information of the collected object is determined based on the position information. The position information includes a plurality of pieces of coordinate information of different positions of the collected object relative to the mobile terminal. A set of coordinate information of different positions of the collected object relative to the mobile terminal may constitute spatial structure information of the collected object.

In an embodiment, according to a distance difference between distance information of a first position of the collected object relative to lire mobile terminal and distance information of a second position adjacent to the first position relative to the mobile terminal, a first position corresponding to the distance difference greater than a difference threshold is determined. Contour information of the collected object is determined according to the first position corresponding to the difference greater than tire difference threshold.

Figure 10:
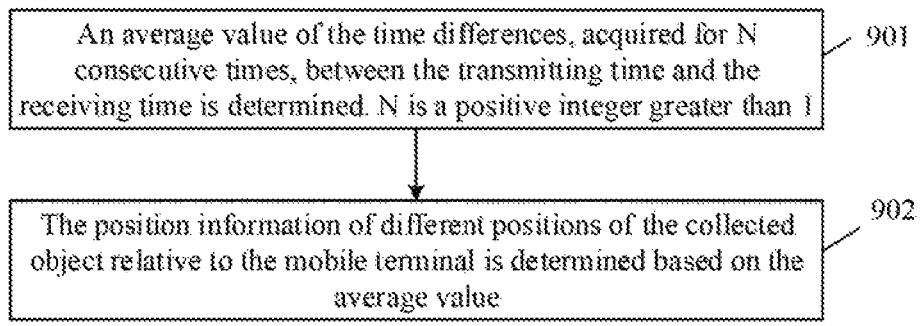
FIG. 10 is a flow chart showing a method for acquiring AR information or VR information, according to another exemplary embodiment.

FIG. 10 is a flow chart showing a method for acquiring AR information or VR information, according to another exemplary embodiment. Referring to FIG. 10, step 801 in which the time difference between the transmitting time and the receiving time is determined includes the following steps.

In step 901, an average value of the time differences, acquired for N consecutive times, between the transmitting time and the receiving time is determined. N is a positive integer greater than 1. The time differences may be acquired for N consecutive times at a sampling frequency greater than a sampling frequency threshold, and the average value may be determined.

In step 902, the position information of different positions of the collected object relative to the mobile terminal is determined based on the average value. Mere, position information of different positions of the collected object relative to the mobile terminal is determined based on the average value, so that the determined position information is more accurate.

Figure 11:
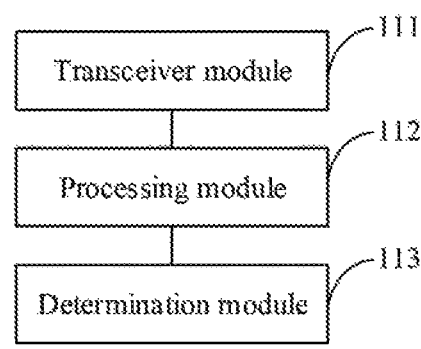
FIG. 11 is a block diagram illustrating a device for acquiring AR information or VR information, according to an exemplary embodiment.

FIG. 11 is a block diagram illustrating a device for acquiring AR information or VR information, according to an exemplary embodiment. Referring to FIG. 11, the device is applied to a mobile terminal. The device includes a transceiver module 111 and a processing module 112.

The transceiver module 111 is configured to transmit, during image collection, a radar wave and receive an echo formed based on the radar wave.

The processing module 112 can be configured to determine, according to a transmitting parameter of the radar wave and an echo parameter of the echo, spatial structure information of a collected object in the image collection, and obtain AR information or VR information of the collected object according to the spatial structure information and a collected image.

In an embodiment, the transceiver module III can be further configured to establish a three-dimensional space model of the collected object according to the spatial structure information and the collected image. The three-dimensional space model can include structural features of the collected object indicated by the spatial structure information and texture features of the collected object in the image collection, and obtain the AR information or the VR information according to the three-dimensional space model.

In an embodiment, the transceiver module 111 is further configured to map the spatial structure information to the collected image, establish a corresponding relationship between position information of a reflection point in the spatial structure information and feature information of a feature point of the collected object in the image, and obtain an AR space model or a VR space model of the collected object. The position information of the reflection point includes position information of a reflection point transmitting the radar wave on the collected object relative to the mobile terminal.

In an embodiment, the device further includes a determination module 113. The determination module 113 is configured to determine a collection direction for collecting the image.

The transceiver module 111 is further configured to transmit, during the image collection, the radar wave along the collection direction.

In an embodiment, the transmitting parameter includes transmitting time, the echo parameter includes receiving time, and the processing module 112 can be further configured to determine a time difference between the transmitting time and the receiving time, determine, based on the time difference, position information of different positions of the collected object relative to the mobile terminal, and determine the spatial structure information of the collected object based on the position information.

In an embodiment, the processing module 112 can also be configured to determine an average value of the lime differences, acquired for N consecutive times, between the transmitting time and the receiving time, N being a positive integer greater than 1, and determine, based on the average value, the position information of different positions of the collected object relative to the mobile terminal.

An embodiment of the disclosure also provides a mobile terminal, which includes a processor and a memory configured to store instructions executable by the processor. The processor is configured to implement, when executing the executable instructions, the method steps described in any embodiment of the disclosure.

An embodiment of the disclosure also provides a non-transitory computer-readable storage medium, having a computer program stored thereon. The program is executed by a processor to implement the method steps described in any embodiment of the disclosure.

Figure 12:
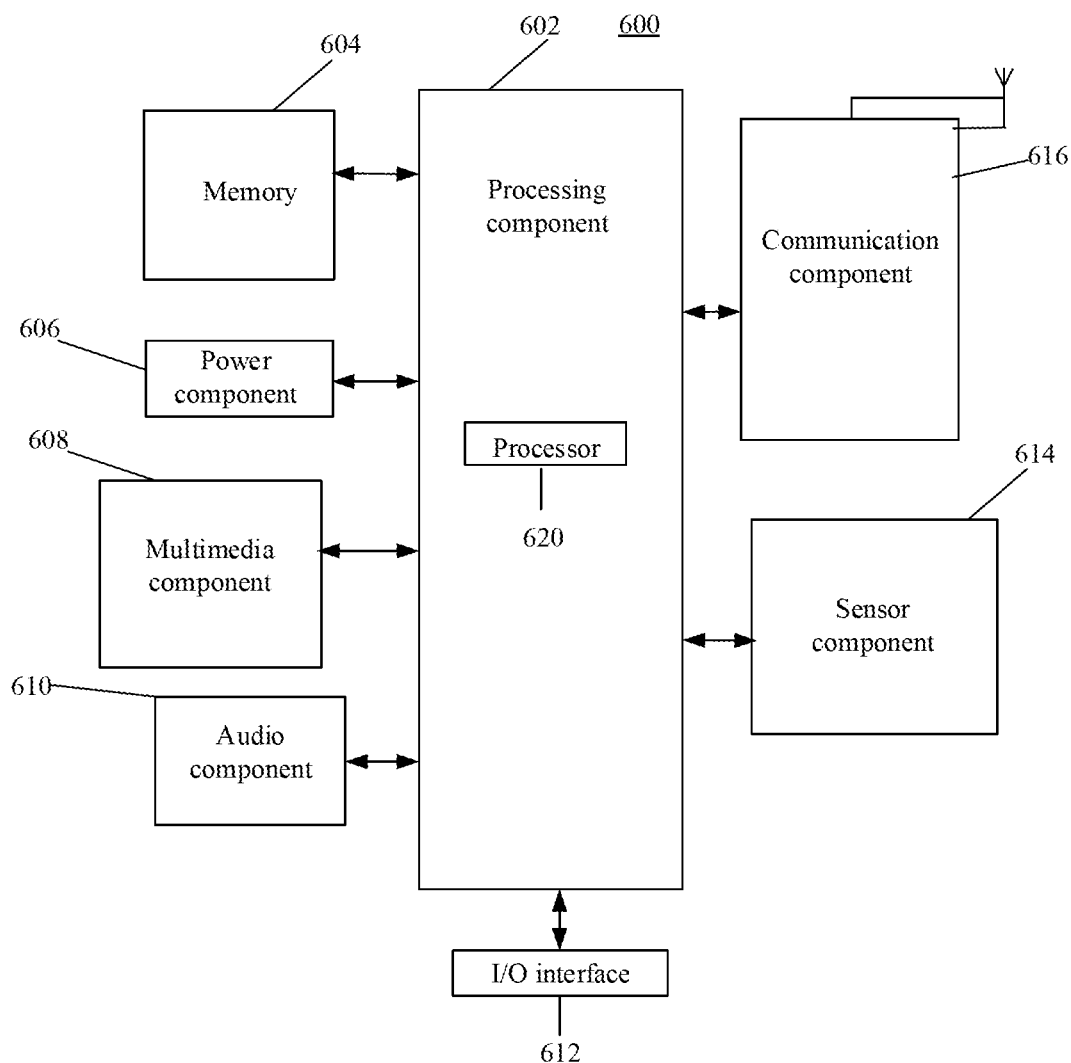
FIG. 12 is a block diagram illustrating a mobile terminal, according to an exemplary embodiment.

FIG. 12 is a block diagram illustrating a mobile terminal 600, according to an exemplary embodiment. For example, the mobile terminal 600 may be a mobile phone, a computer, a digital broadcast mobile terminal, a messaging device, a gaming console, a tablet, a medical device, exercise equipment, a personal digital assistant, and the like.

Referring to FIG. 12, the mobile terminal 600 may include one or more of the following components: a processing component 602, a memory 604, a power component 606, a multimedia component 608, an audio component 610, an input output (I/O) interface 612, a sensor component 614, and a communication component 616.

The processing component 602 typically controls overall operations of the mobile terminal 600, such as operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the mobile terminal 600. Examples of such data include instructions for any applications or methods operated on the mobile terminal 600, contact data, phonebook data, messages, pictures, video, and the like. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the mobile terminal 600. The power component 606 may include a power management system, one or more power sources, and any other components associated with the generation, management and distribution of power in the mobile terminal 600.

The multimedia component 608 includes a screen providing an output interface between the mobile terminal 600 and the user. In some embodiments, the screen may include a liquid crystal display (LCD) and a touch panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 608 includes a from camera and/or a rear camera. The front camera and/or the rear camera may receive an external multimedia datum while the mobile terminal 600 is in an operation mode, such as a photographing mode or a video mode. Each of the from camera and lire rear camera may be a fixed optical lens system or have focus and optical zoom capability.

The audio component 610 is configured to output and/or input audio signals. For example, the audio component 610 includes a microphone (MIC) configured to receive an external audio signal when the mobile terminal 600 is in an operation mode, such as a call mode, a recording mode, and a voice recognition mode. The received audio signal may be further stored in the memory 804 or transmitted via the communication component 616. In some embodiments, the audio component 610 fun her includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the mobile terminal 600. For example, the sensor component 614 may detect an on/off status of the mobile terminal 600, relative positioning of components, e.g., the display and the keypad, of the mobile terminal 600, a change in position of the mobile terminal 600 or a component of the mobile terminal 600, a presence or absence of user contact with the mobile terminal 600, an orientation or an accelerator/deceleration of the mobile terminal 600, and a change in temperature of the mobile terminal 600. The sensor component 614 may include a proximity sensor configured to detect the presence of nearby objects without any physical contact. The sensor component 814 may also include a light sensor, such as a complementary metal oxide semiconductor (CMOS) or charge coupled device (CCD) image sensor, for use in imaging applications. In some embodiments, the sensor component 614 may also include an acceleration sensor, a gyroscope sensor, a magnetic sensor, a pressure sensor, or a temperature sensor.

The communication component 616 is configured to facilitate communication, wired or wirelessly, between the mobile terminal 600 and other devices. The mobile terminal 600 may access a wireless network based on a communication standard, such as WiFi, 2G or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the mobile terminal 600 may be implemented with one or more application specific integrated circuits (ASICs), digital signal processors (DSPs), digital signal processing devices (DSPDs), programmable logic devices (PLDs), field programmable gate arrays (PP- GAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 of the mobile terminal 600, for performing the above described methods. For example, the non-transitory computer-readable storage medium may be a ROM, a random access memory (RAM), a compact disc read-only memory (CD-ROM), a magnetic tape, a floppy disc, an optical data storage device, and the like.

When instructions in a non-transitory computer-readable storage medium are executed by a processor of a mobile terminal, the mobile terminal is caused to perform the information processing methods described in the above embodiments.

Other embodiments of the disclosure will be apparent to those skilled in the an from consideration of the specification and practice of the disclosure disclosed here. The disclosure is intended to cover any variations, uses, or adaptations of the disclosure following the general principles thereof and including such departures from the disclosure as come within known or customary practice in the an. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by live appended claims.

What is claimed is:

1. A method for acquiring augmented reality (AR) information or virtual reality (VR) information that is applied to a mobile terminal, comprising:
   determining a collection direction for collecting an image, and performing image collection by transmitting a radar wave along the collection direction and receiving an echo formed based on the radar wave;
   determining an average value of time differences that are acquired for N consecutive times between a transmitting time of the radar wave and a receiving time of an echo at a sampling frequency greater than a sampling frequency threshold, where N is a positive integer greater than 1; determining position information of different positions of a collected object relative to the mobile terminal based on the average value; and determining spatial structure information of the collected object based on the position information; and
   obtaining AR information or VR information of the collected object according to the spatial structure information and a collected image.

2. The method of claim 1, wherein the obtaining the AR information or VR information of the collected object according to the spatial structure information and the collected image further comprises:
   establishing a three-dimensional space model of the collected object according to the spatial structure information and the collected image, wherein the three-dimensional space model includes structural features of the collected object indicated by the spatial structure information and texture features of the collected object in the image collection; and
   obtaining the AR information or the VR information according to the three-dimensional space model.

3. The method of claim 1, wherein the mobile terminal is installed with two radar sensors, including a front radar sensor installed on a same side as a front camera in the mobile terminal, and a rear radar sensor installed on a same side as a rear camera in the mobile terminal.

4. The method of claim 1, wherein a radar sensor is installed on a rotating component of the mobile terminal, and the rotating component of the mobile terminal drives the radar sensor to change a direction.

5. The method of claim 1, further comprising:
   determining a distance difference between distance information of a first position of the collected object relative to the mobile terminal and distance information of a second position adjacent to the first position relative to the mobile terminal;
   in response to that the distance difference is greater than a difference threshold, determining, according to the distance difference, a first position corresponding to the distance difference, and
   determining contour information of the collected object according to the first position.

6. A device for acquiring augmented reality (AR) information or virtual reality (VR) information that is applied to a mobile terminal, comprising:
   a processor; and
   a memory for storing instructions executable by the processor;
   wherein the processor is configured to:
      determine a collection direction for collecting an image, perform an image collection by transmitting a radar wave along the collection direction and receive an echo formed based on the radar wave;
      determine an average value of time differences that are acquired for N consecutive times between a transmitting time of the radar wave and a receiving time of an echo at a sampling frequency greater than a sampling frequency threshold, where N is a positive integer greater than 1; determine position information of different positions of a collected object relative to the mobile terminal based on the average value; and determine spatial structure information of the collected object based on the position information; and
      obtain AR information or VR information of the collected object according to the spatial structure information and the collected image.

7. The device of claim 6, wherein the processor is further configured to:
   establish a three-dimensional space model of the collected object according to the spatial structure information and the collected image, wherein the three-dimensional space model includes structural features of the collected object indicated by the spatial structure information and texture features of the collected object in the image collection; and
   obtain the AR information or the VR information according to the three-dimensional space model.

8. The device of claim 6, wherein the mobile terminal is installed with two radar sensors, including a front radar sensor installed on a same side as a front camera in the mobile terminal, and a rear radar sensor installed on a same side as a rear camera in the mobile terminal.

9. The device of claim 6, wherein a radar sensor is installed on a rotating component of the mobile terminal, and the rotating component of the mobile terminal drives the radar sensor to change a direction.

10. The device of claim 6, wherein the processor is further configured to:
- determine a distance difference between distance information of a first position of the collected object relative to the mobile terminal and distance information of a second position adjacent to the first position relative to the mobile terminal;
- in response to that the distance difference is greater than a difference threshold, determine, according to the distance difference, a first position corresponding to the distance difference, and
- determine contour information of the collected object according to the first position.

11. A non-transitory computer-readable storage medium storing a computer program, the program being executed by a processor to implement a method for acquiring augmented reality (AR) information or virtual reality (VR) information that is applied to a mobile terminal, comprising:
- determining a collection direction for collecting an image, and transmitting a radar wave along the collection direction and receiving an echo formed based on the radar wave during image collection;
- determining an average value of time differences that are acquired for N consecutive times between a transmitting time of the radar wave and a receiving time of an echo at a sampling frequency greater than a sampling frequency threshold, where N is a positive integer greater than 1; determining position information of different positions of a collected object relative to the mobile terminal based on the average value; and determining spatial structure information of the collected object based on the position information; and
- obtaining AR information or VR information of the collected object according to the spatial structure information and a collected image.

12. The non-transitory computer-readable storage medium of claim 11, wherein the obtaining the AR information or VR information of the collected object according to the spatial structure information and the collected image further comprises:
- establishing a three-dimensional space model of the collected object according to the spatial structure information and the collected image, where the three-dimensional space model includes structural features of the collected object indicated by the spatial structure information and texture features of the collected object in the image collection; and
- obtaining the AR information or the VR information according to the three-dimensional space model.

13. The non-transitory computer-readable storage medium of claim 11, wherein the mobile terminal is installed with two radar sensors, including a front radar sensor installed on a same side as a front camera in the mobile terminal, and a rear radar sensor installed on a same side as a rear camera in the mobile terminal.

14. The non-transitory computer-readable storage medium of claim 11, wherein a radar sensor is installed on a rotating component of the mobile terminal, and the rotating component of the mobile terminal drives the radar sensor to change a direction.

15. The non-transitory computer-readable storage medium of claim 11, wherein the method further comprises:
- determining a distance difference between distance information of a first position of the collected object relative to the mobile terminal and distance information of a second position adjacent to the first position relative to the mobile terminal;
- in response to that the distance difference is greater than a difference threshold, determining, according to the distance difference, a first position corresponding to the distance difference, and
- determining contour information of the collected object according to the first position.

* * * * *